United States Patent [19]
Naudin

[11] Patent Number: 4,655,331
[45] Date of Patent: Apr. 7, 1987

[54] CLUTCH COVER ASSEMBLY
[75] Inventor: Jacky Naudin, Asnieres, France
[73] Assignee: Valeo, Paris, France
[21] Appl. No.: 733,198
[22] Filed: May 13, 1985
[30] Foreign Application Priority Data
May 18, 1984 [FR] France .................. 84 07741
[51] Int. Cl.[4] ............................................. F16D 13/50
[52] U.S. Cl. .............................. 192/70.18; 192/70.28; 192/89 B; 192/109 R
[58] Field of Search ............... 192/70.13, 70.18, 70.28, 192/89 B, 109 R

[56] References Cited
U.S. PATENT DOCUMENTS

| | | | |
|---|---|---|---|
| 3,489,256 | 1/1970 | Binder et al. ............... | 192/70.18 X |
| 4,122,929 | 10/1978 | Mancher et al. ............ | 192/70.18 |
| 4,423,804 | 1/1984 | Kettel et al. ................ | 192/109 R |
| 4,558,771 | 12/1985 | Després ...................... | 192/70.18 |

FOREIGN PATENT DOCUMENTS

| | | |
|---|---|---|
| 1529779 | 6/1968 | France . |
| 2342427 | 9/1977 | France . |
| 2437525 | 4/1980 | France . |
| 2032017 | 4/1980 | United Kingdom . |

*Primary Examiner*—Rodney H. Bonck
*Assistant Examiner*—Richard M. Lorence
*Attorney, Agent, or Firm*—Charles E. Brown; Charles A. Brown

[57] ABSTRACT

A clutch cover assembly is adapted to rotate about an axis in a predominant direction. It comprises a cover formed with radial openings bordered circumferentially by axially offset fixing and retaining lugs. Tabs on a pressure plate pass through the openings and are linked by circumferential strips to the fixing lugs. They are provided with retaining means adapted to come into bearing engagement against the retaining lugs. The axial offset between the fixing and retaining lugs is such that the strips may be fixed to the tabs and to the retaining lugs for the opposite rotation direction while retaining the same curvature for a given axial position of the pressure plate.

9 Claims, 7 Drawing Figures

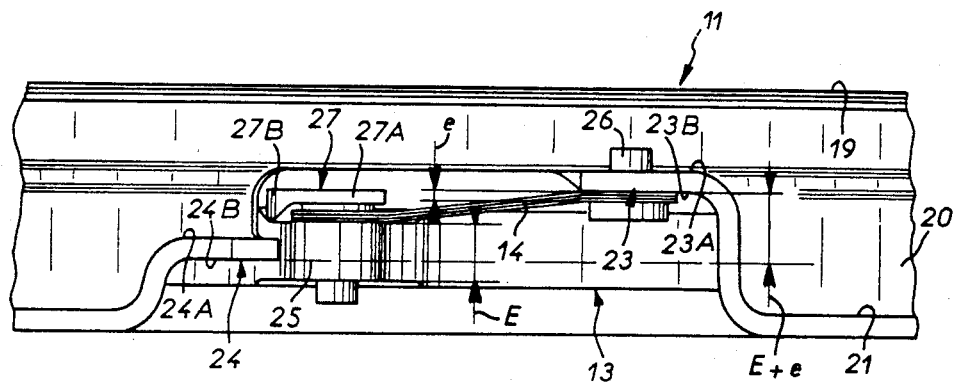
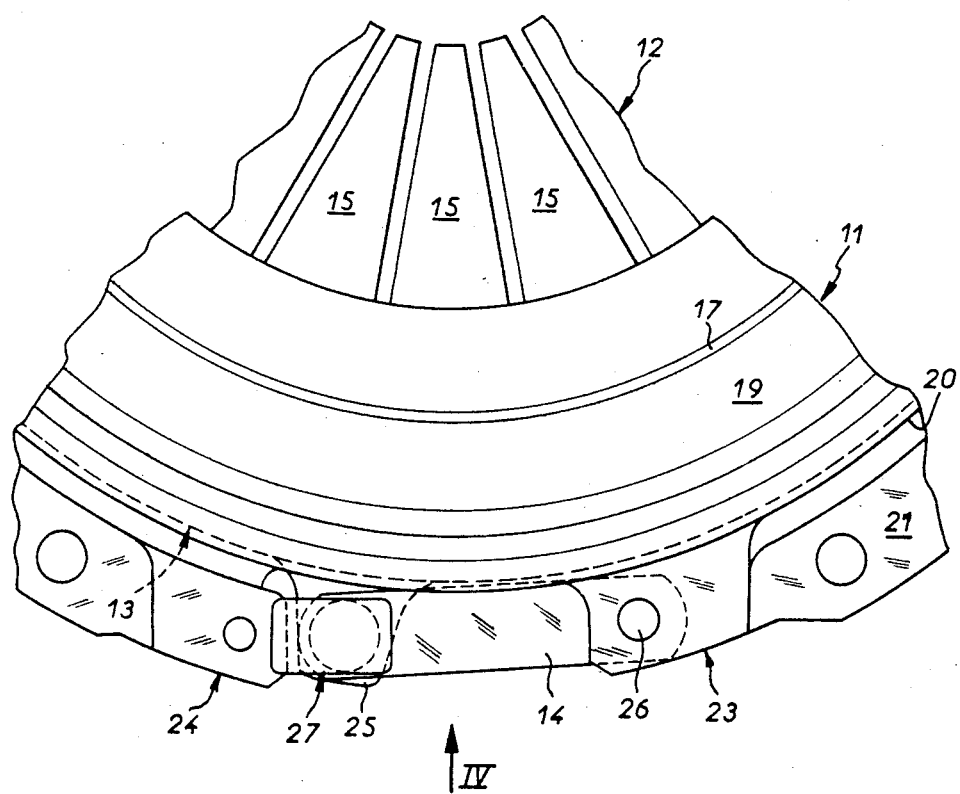

CLUTCH COVER ASSEMBLY

BACKGROUND OF THE INVENTION

1. Field of the Invention

The present invention concerns clutch cover assemblies with a predominant direction of rotation and is more particularly directed to the shape of their cover.

2. Description of the Prior Art

As is well known, a clutch cover assembly principally comprises a cover, an engagement member such as a diaphragm spring and at least one pressure plate. The cover, generally hollow, comprises an annular back, a skirt with openings, and a flange for fixing the cover to a reaction plate, also called the flywheel, which is generally fastened to a driving shaft, the internal combustion engine output shaft in the case of an automobile vehicle, for example. The pressure plate is designed to be urged away from the back of the cover by the engagement member so as to press on a friction disk fast with a driven shaft and disposed axially between the pressure and reaction plates.

To this end the pressure plate is rotationally coupled to the cover, with provision for relative axial movement between them.

In practice the link between the cover and the pressure plate is provided by axially flexible circumferential strips the respective ends of which are fixed to radially projecting tabs formed on the pressure plate and fixing lugs fast with the cover. The tabs on the pressure plate pass through the skirt of the cover by means of the aforementioned openings and the fixing lugs are disposed in the vicinity of these openings.

A distinction is drawn between two major categories of clutch cover assemblies, according to whether they are adapted to be driven by a motor in one particular direction around their axis or whether they are adapted to be associated with motors turning in either direction.

When both directions are possible, the openings in the cover provide for a substantially diametral plane of symmetry, the openings being bordered in the circumferential direction by two fixing lugs disposed in a common transverse plane, designed for fastening the strips for respective directions of rotation.

A symmetrical configuration of the openings corresponds to relatively large overall dimensions axially, radially and circumferentially. Furthermore, for a number of years there has been an increasingly marked preference for one particular direction of rotation (called the forward direction), to the detriment of the other (the reverse or retrograde direction). Thus there have recently been proposed covers with assymetric openings featuring, inter alia, smaller overall dimensions.

The circumferential strips linking pressure plate and cover are in practice critical to the correct functioning of a clutch cover assembly. These are thin parts, of more or less marked curvature according to the position of the pressure plate relative to the back of the cover, the mechanical specifications of which, in particular with regard to their elasticity, must be such that these strips exert on the pressure plate an axial return force towards the back of the cover which is sufficiently low as not to impede the engagement member (more often than not a diaphragm spring) pressing the pressure plate away from the back of the cover so as to drive through friction, under good conditions, a disk of the aforementioned type, but which is also sufficiently high to provide for the lifting of the pressure plate away from the friction disk when the engagement member releases its pressure on said plate.

To preserve the elastic properties of the strips it is necessary to maintain the axial offsetting of their ends, and thus their curvature, within closely specified limits. In particular, during storage, at which time the cover is not fastened to any reaction plate, it is necessary to avoid the pressure plate being moved away from the back of the cover by the engagement member to the point where it causes unwanted plastic deformation of the strips, as a result of which they become warped.

There have been proposed, as shown for example by French patent Nos. 2 342 427 and 2 437 525, covers in which the openings are bordered circumferentially by two lugs offset axially (and circumferentially); the lug which is disposed near the back of the cover is called the fixing lug, while the other lug is called the retaining lug. The latter is intended to serve as a bearing member for the axial retaining means carried by the tabs of the pressure plate so as to prevent excessive displacement of the latter relative to the back of the cover. These retaining means comprise, in the case of the aforementioned patents, for example, a circumferential projection on the strips or a bearing surface formed on the tabs themselves.

An arrangement of this kind, which is an optimum one given the constraints imposed on clutch cover assemblies providing for a predominant direction of rotation, does not permit the use of said clutch cover assemblies in the opposite direction of rotation. As a result, the spare parts store management has to provide a special category of covers and even of pressure plates for the repair or replacement of clutch cover assemblies operating in said opposite direction. This requirement is all the more burdensome in that in some countries the law obliges manufacturers to retain spare parts for periods of as much as ten years or more beyond the termination of manufacture.

An object of the present invention is to eliminate this disadvantage by providing for the elimination from stocks of a specific range of covers for the retrograde rotation direction. It provides for the implementation of clutch cover assembly covers for a preferred rotation direction so that they are compatible with use in the opposite direction.

SUMMARY OF THE INVENTION

The invention consists in a clutch cover assembly adapted to rotate about an axis in a specific direction, comprising a hollow cover incorporating an annular back, a skirt formed with openings each bordered in the circumferential direction by two lugs offset axially and circumferentially of which one lug, hereinafter referred to as the fixing lug, is disposed axially between said back of said cover and the other lug, hereinafter referred to as the retaining lug, and a flange for attaching said cover to a reaction plate, at least one pressure plate having radially projecting tabs passing through said openings in said skirt, an engagement member adapted to urge said pressure plate in the axial direction away from said back of said cover, and axially flexible circumferential strips adapted to couple said pressure plate and said cover rotationally, with provision for relative axial movement between them, wherein said tabs, said retaining lugs and said fixing lugs are delimited by respective coplanar outside transverse surfaces facing axially towards said back of said cover and respective coplanar inside transverse surfaces facing axially away from said back, and wherein, for each of said openings, the axial offset between one transverse side of said fixing lug and one transverse side of said retaining lug is such that a strip features identical curvatures when, for the aforementioned direction of rotation, it is fixed to said transverse surface of said fixing lug and said outside transverse surface of a tab and when, for the rotation direction opposite the aforementioned direction of rotation, it is fixed to said transverse surface of said retaining lug and to said inside transverse surface of said tab.

It will be noted that in a clutch cover assembly in accordance with the invention the component parts may be the same for either direction of rotation; only the way in which they are assembled varies, that of the lugs referred to as the retaining lug having an axial bearing function or a fixing function, according to the direction of rotation. It will be understood that, for both directions of rotation, the strips feature the same curvature for a given axial position of the pressure plate and that in both cases they exert similar elastic forces on the latter. The axial forces applied to the pressure plate in service are thus independent of the direction of rotation.

In a preferred embodiment the strips are fixed to the inside surface of the fixing or retaining lugs for both directions, the axial offset between these surfaces being substantially equal to the sum of the axial dimensions of a tab and a strip; this condition must be applied allowing for manufacturing tolerance which can cumulatively total several tenths of a millimeter. It is naturally advantageous for this condition to be met with the highest possible accuracy, one tenth of a millimeter, for example. The invention naturally covers the other three cases whereby the strips are fixed to the outside surface of the lugs in either direction or both.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 3 is a partial axial view of it in the direction of the arrow III in FIG. 1.

FIG. 4 is a partial radial view of it in the direction of the arrow IV in FIGS. 1 and 3.

DESCRIPTION OF THE PREFERRED EMBODIMENTS

Figure 1:
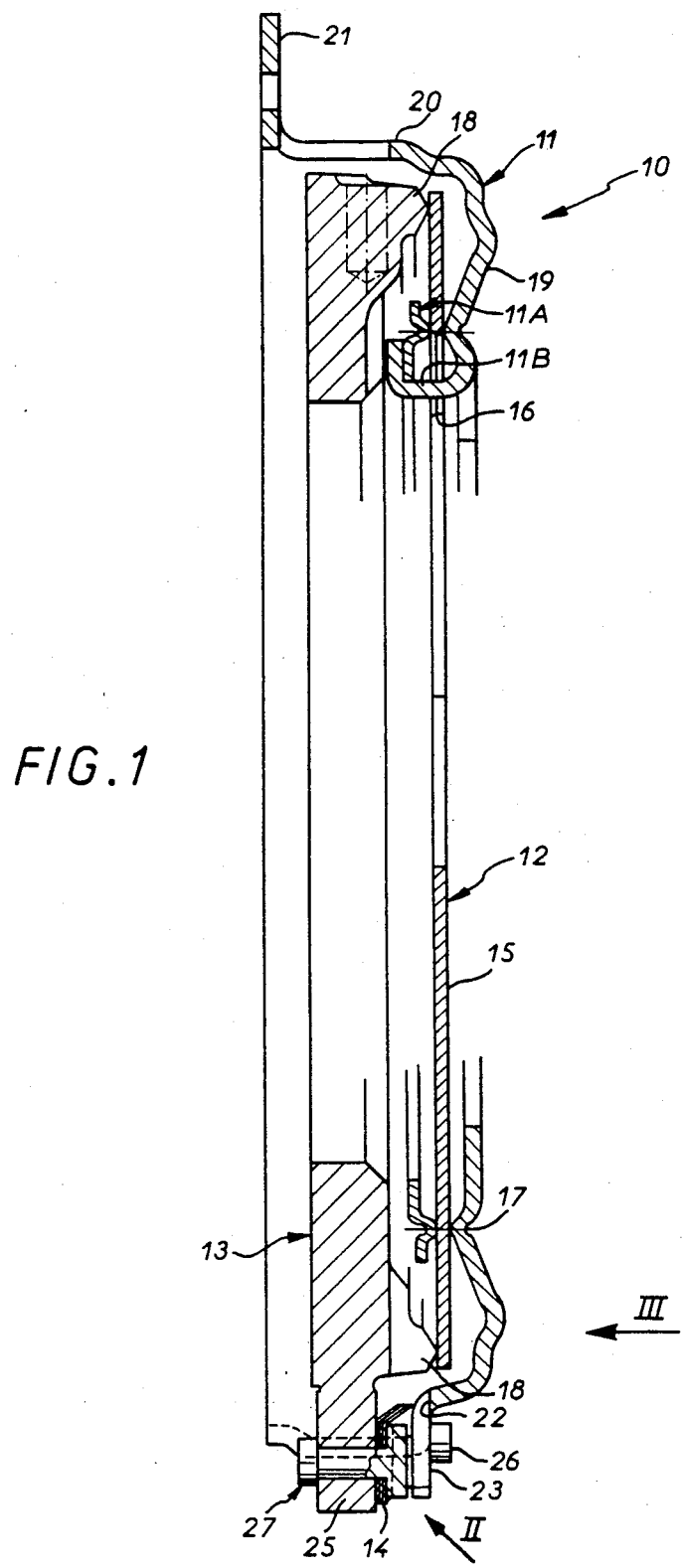
FIG. 1 is diametral axial cross-section through a clutch cover assembly in accordance with the invention.

FIGS. 1 through 7 show by way of example a clutch cover assembly 10 comprising in the conventional manner a hollow cover 11, a diaphragm spring 12 forming an engagement member, a pressure plate 13 and circumferential strips 14 which are axially flexible.

The diaphragm spring 12 comprises an outside peripheral part forming a Belleville spring extended radially inwards by radial fingers 15 separated by slots 16. In the clutch engaged position the peripheral part of the diaphragm spring is engaged against a rib 17 on the cover and on bosses 18 on the pressure plate disposed at a greater distance from the axis X—X than the rib 17; in the example shown, the clutch cover assembly is of the "push" type. The diaphragm spring is held against the rib 17 by an annular member 11A fixed to the cover by lugs 11B.

The cover principally comprises an annular back or endwall 19, a generally axial skirt 20 and a flange 21 for fixing the cover to a reaction flywheel (not shown). The skirt 20 comprises openings 22 bordered circumferentially by lugs 23 and 24 offset axially and circumferentially.

The pressure plate comprises radially projecting tabs 25 each passing through one opening 22 in the skirt 20 of the cover.

The lugs 23 and 24 and the tabs 25 are delimited axially by respective outside transverse surfaces 23A, 24A and 25A facing axially towards the back 19 of the cover and respective inside transverse surfaces 23B, 24B and 25B facing axially away from said back 19.

In the example of FIGS. 1 through 4, the strips 14 are fixed to the lugs 23, called fixing lugs, on their inside surfaces 23B, by means of rivets 26. These strips are also fixed to the outside transverse surfaces of the tabs 25 by rivets 27, these surfaces facing towards the back of the cover. Note that the position of the fixing lugs depends on the curvature of the strips when the clutch is in the "brand new clutch engaged" position.

Figure 2:
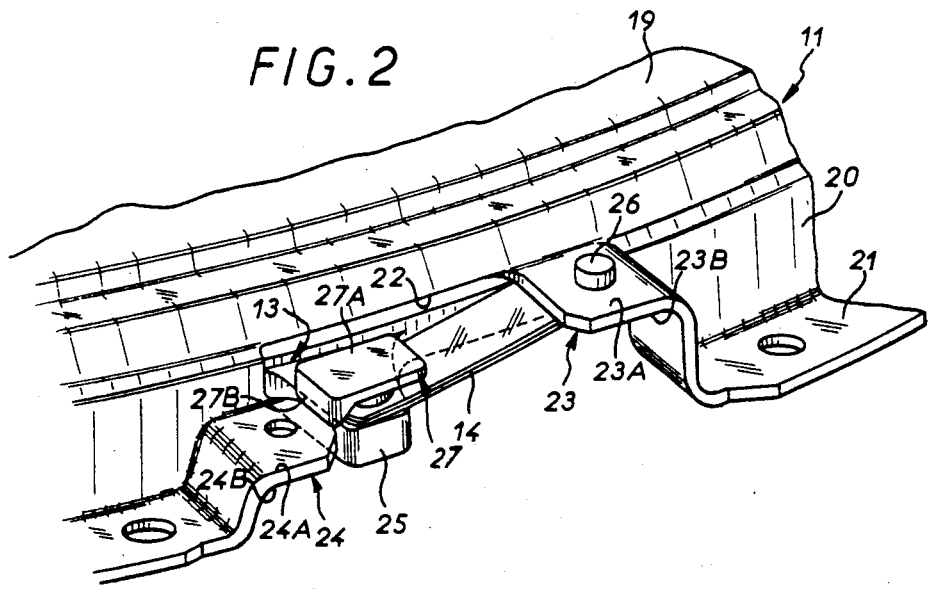
FIG. 2 is a partial view of it in perspective in the direction of the arrow II in FIG. 1, showing the configuration of the strips for the forward direction.

As is clear from FIGS. 2 and 4 in particular, the rivets 27, in the example under consideration, have a flattened head 27A bordered circumferentially on the side of the lug 24 known as the retaining lug by a projection 27B designed to abut axially against the outside surface 24A if the pressure plate moves excessively away from the back 19 of the cover.

If E is the axial dimension of the tabs 25 and if e is the axial dimension of the strips, the inside transverse surfaces 23B and 24B of the fixing and retaining lugs, respectively, are advantageously offset in the axial direction by the sum (E+e) of the aforementioned dimensions.

Figure 5:
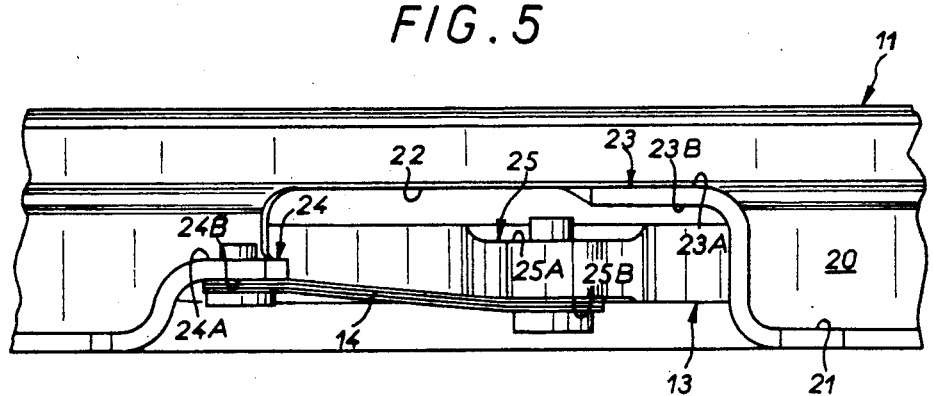
FIG. 5 is a partial radial view analogous to FIG. 4 showing the configuration of the strips for the reverse direction.

FIG. 5 shows the strips 14 mounted on the cover, on the inside surface of the retaining lugs 24, and on the pressure plate, on the inside surface 25B of the tabs 25. The pressure plate is shown in FIGS. 4 and 5 at the same axial distance from the cover, but with a circumferential offset. It is easy to verify that, given the aforementioned value of the offset between the surfaces 23B and 24B, the strips 14 feature the same curvature in their forward configuration (FIG. 4) and in their reverse configuration (FIG. 5). They thus behave in the same way in relation to the pressure plate in both cases.

It should be noted that the lengths of the fixing lugs and the retaining lugs are such that, in the arrangement of FIG. 4 or FIG. 5, final riveting of the strips can be carried out without any "bayonet" type movement being necessary thanks to the gap thus left for tools to be passed through.

Figure 6:
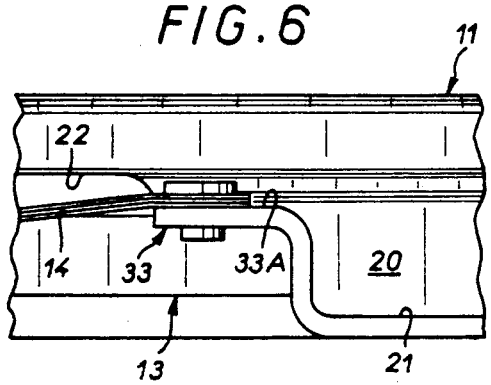
FIG. 6 is a partial radial half-view showing a variation on FIG. 4.

FIG. 6 shows a variation on the righthand part of FIG. 4. The strip 14 is fixed to the outside surface 33A of the fixing lugs 33. In the example shown, the latter are disposed axially so that the strip 14 is at the same level as in FIG. 4.

Figure 7:
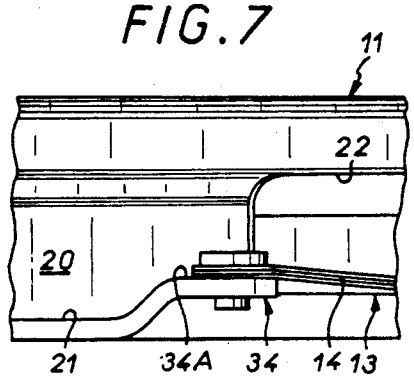
FIG. 7 is a partial radial half-view showing a variation on FIG. 5.

FIG. 7 shows a variation on the lefthand part of FIG. 5. The strip 14 is fixed to the outside surface 34A of the retaining lugs 34. In the examples shown, the latter are disposed axially so that the strip 14 is at the same level as in FIG. 5.

Three variations on the FIGS. 4 and 5 arrangements may be arrived at by substituting or not FIG. 6 for the righthand part of FIG. 4 and substituting or not FIG. 7 for the lefthand part of FIG. 5. In each of these variants, the strips 14 retain the same curvature.

It can be verified that the axial offset between the outside surfaces 33A and 34A is, as previously, (E+e), the axial offset between the surfaces 23B and 34A is (E+2 e) and the offset between the surfaces 33A and 24B is E. These three conditions, like that explained with regard to FIGS. 4 and 5, are characteristics of the invention, and one of them must be satisfied for the strips to be able to have the same curvature for a given axial position of the pressure plate in the two assembly modes.

It will be understood that various changes in the details, materials and arrangements of parts which have been herein described and illustrated in order to explain the nature of the invention may be made by those skilled in the art within the principle and scope of the invention as expressed in the appended claims.

For example, the shape and position of the diaphragm spring and the shape of the cover may be varied in numerous ways. It will be noted that in practice the strips are preferably fixed to the inside surface of the fixing lugs so that these permit maximum axial movement of the pressure plate towards the back of the cover in an assembly corresponding to the reverse direction. The unused holes in the retaining lugs (or the fixing lugs, as the case may be) are advantageously used for fixing balancing rivets. It will be noted that the conditions previously stated for the cases in which the strips are fixed to the outside surfaces of the fixing and retaining lugs or to the inside surfaces of the latter are simultaneously satisfied if these lugs have the same thickness. The nature of the engagement member (diaphragm spring or coil springs) is of little importance. The invention is equally applicable to clutches of the pull type and clutches of the push type.

I claim:

1. A clutch cover assembly adapted to rotate about an axis in a specific direction, said clutch cover assembly comprising a hollow cover incorporating an annular endwall, a skirt being formed with openings, each opening being bordered in the circumferential direction by two lugs offset axially and circumferentially from each other including a fixing lug and a retaining lug, said fixing lug disposed axially between said endwall of said cover and said retaining lug, and a flange for attaching said cover to a reaction plate, at least one pressure plate having radially projecting tabs passing through said openings in said skirt, an engagement member adapted to urge said pressure plate in an axial direction away from said endwall of said cover, and axially flexible circumferential straps adapted to couple said pressure plate and said cover rotationally, with provision for relative axial movement therebetween, wherein said tabs and said retaining lugs and said fixing lugs have respective first parallel transverse surfaces facing axially towards said endwall of said cover and respective second parallel transverse surfaces facing axially away from said endwall, each of said circumferential straps having a given configuration and being adapted to be selectively fixed to said fixing lug and said first transverse surface of said pressure plate projecting tab for one direction of rotation of the cover assembly and to said retaining lug and said second transverse surface of said pressure plate projecting tab for an opposite direction of rotation of the cover assembly.

2. Clutch cover assembly according to claim 1, wherein said second transverse surface of said fixing lugs is axially offset from said second transverse surface of said retaining lugs by an amount equal to the sum of the axial dimension of a said pressure plate tab and a said strap.

3. Clutch cover assembly according to claim 1, wherein said first transverse surface of said fixing lugs is axially offset from said first transverse surface of said retaining lugs by an amount equal to the sum of the axial dimensions of a said pressure plate tab and a said strap.

4. Clutch cover assembly according to claim 1, wherein said second transverse surface of said fixing lugs is axially offset from said first transverse surface of said retaining lugs by an amount equal to the axial dimension of a said pressure plate tab.

5. A clutch cover assembly according to claim 1, wherein said first transverse surface of said fixing lugs is axially offset from said second transverse surface of said retaining lugs by an amount equal to the sum of the axial dimension of a said pressure plate tab and twice the axial dimension of a said strap.

6. A clutch cover assembly according to claim 1, wherein each of said circumferential straps is fixed to said second transverse surface of said fixing lug for the one direction of rotation of the cover assembly and is fixed to said second transverse surface of said retaining lug for the other direction of rotation of the cover assembly.

7. Clutch cover assembly according to claim 1, wherein each of said circumferential straps is fixed to said first transverse surface of said fixing lug for the one direction of rotation and is fixed to said first transverse surface of said retaining lug for the other direction of rotation of the cover assembly.

8. Clutch cover assembly according to claim 1, wherein each of said circumferential straps is fixed to said first transverse surface of said fixing lug for the one direction of rotation and is fixed to said second transverse surface of said retaining lug for the other direction of rotation.

9. Clutch cover assembly according to claim 1, wherein each of said circumferential straps is fixed to said second transverse surface of fixing lug for the one direction of rotation and is fixed to said first transverse surface of said retaining lug for the other direction of rotation of the cover assembly.

* * * * *